(12) United States Patent
Soejima et al.

(10) Patent No.: US 6,199,105 B1
(45) Date of Patent: Mar. 6, 2001

(54) RECOVERY SYSTEM FOR SYSTEM COUPLING APPARATUSES, AND RECORDING MEDIUM RECORDING RECOVERY PROGRAM

(75) Inventors: Yasushi Soejima; Takashi Fuju, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/207,617

(22) Filed: Dec. 9, 1998

(30) Foreign Application Priority Data

Dec. 9, 1997 (JP) .................................................. 9-338615

(51) Int. Cl.$^7$ ....................................................... G06F 13/00
(52) U.S. Cl. ......................... 709/213; 709/214; 709/226; 714/5
(58) Field of Search .................................... 709/201, 202, 709/210, 213, 214, 223, 224, 226; 714/345, 6, 8

(56) References Cited

U.S. PATENT DOCUMENTS

| 5,339,427 | * | 8/1994 | Elko et al. | ............................ 709/103 |
| 5,463,733 | * | 10/1995 | Forman et al. | ........................ 714/10 |
| 5,550,973 | * | 8/1996 | Forman et al. | ........................ 714/10 |
| 5,623,670 | * | 4/1997 | Bohannon et al. | .................. 710/200 |

FOREIGN PATENT DOCUMENTS 61-221956   10/1986   (JP) .

* cited by examiner

*Primary Examiner*—Viet D. Vu
(74) *Attorney, Agent, or Firm*—Young & Thompson

(57) ABSTRACT

Each of a plurality of hosts requests one of system coupling apparatuses to lock one of an inter-host shared resources, and stores lock information notified by the system coupling apparatus; each of the plurality of system coupling apparatuses locks an inter-host shared resource whose locking has been requested by one of the hosts, holds lock information indicating the locking, and notifies the requesting host of the lock information; one of the plurality of hosts, when one of the plurality of system coupling apparatuses fails, causes lock information held by other normal system coupling apparatuses to be deleted; and one of the other normal system coupling apparatuses is requested to lock said inter-host shared resource on the basis of lock information stored in the requesting host.

18 Claims, 11 Drawing Sheets

RECOVERY SYSTEM FOR SYSTEM COUPLING APPARATUSES, AND RECORDING MEDIUM RECORDING RECOVERY PROGRAM

BACKGROUND OF THE INVENTION

1. Field of the Invention

The present invention relates to a recovery system for system coupling apparatuses (hereinafter called MSCPs) and a recording medium recording a recovery program for use in a computer system including a plurality of processors (hereinafter called hosts) and inter-host shared resources for common use by the hosts, the system coupling apparatuses controlling access from each host to the inter-host shared resources.

2. Description of the Related Art

The Japanese Patent Application Laid-open No. Sho 61-221956 discloses a prior art recovery system for an access control apparatus for use in a computer system wherein, upon issuance of requests for exclusive access to a shared resource by a plurality of data processing units (counterparts to the hosts under the present invention), a single access control apparatus (counterpart to the MSCP under the invention) holds locking information for the shared resource and exclusively controls accesses to that shared resource, whereby, in the event of any failure in the access control apparatus, the lock information in the access control apparatus is recovered according to lock information held by each data processing unit in its control table after the restoration of the access control apparatus.

This prior art recovery system for access control apparatuses, however, involves a problem that the computer system cannot resume its operation until the access control apparatus in trouble is restored and the lock information in the access control apparatus is recovered according to the lock information held by each data processing unit.

SUMMARY AND OBJECTS OF THE INVENTION

An object of the present invention is to enable a computer system, consisting of a plurality of hosts and a plurality of MSCPs, to continue processing of an application program (AP), i.e. the operation of the computer system, in the event of failure of any of the MSCPs during the operation of the computer system, by causing lock information held by all the MSCPs including the one in trouble at the time of the occurrence of the failure to be held distributively among the other MSCPs, without having to wait for the restoration of the MSCP in trouble.

Another object of the invention is to provide the computer system with a reserve MSCP so that, in the event of failure of any of the MSCPs during the operation of the computer system, the performance of the MSCPs pertaining to lock processing before the failure can be maintained after the occurrence of the failure by causing lock information held by all the MSCPs including the one in trouble at the time of the occurrence of the failure to be held distributively among the other MSCPs and the reserve MSCP.

Still another object is to improve, where one MSCP is newly added to a computer system, the performance of the MSCPs pertaining to lock processing by distributing lock information, held by each MSCP before the addition, among the MSCPs whose total number is now greater by one than before and having them perform lock processing.

A first recovery system for system coupling apparatuses according to the invention comprises a plurality of hosts and a plurality of coupling apparatuses for holding lock information on inter-host shared resources for common use by the plurality of hosts, wherein: each of said plurality of hosts requests one of the system coupling apparatuses to lock one of the inter-host shared resources, and stores lock information notified by the system coupling apparatus having locked the inter-host shared resource in compliance with the request; each of said plurality of system coupling apparatuses locks an inter-host shared resource whose locking has been requested by one of the hosts, holds lock information indicating that the inter-host shared resource has been locked, and notifies the requesting host of the lock information; one of said plurality of hosts, when one of said plurality of system coupling apparatuses fails, causes lock information held by other normal system coupling apparatuses to be deleted; and each of said plurality of hosts requests one of said other normal system coupling apparatuses to lock an inter-host shared resource on the basis of lock information stored in the requesting host.

A second recovery system for system coupling apparatuses according to the invention comprises a plurality of hosts, a plurality of coupling apparatuses for holding lock information on inter-host shared resources for common use by the plurality of hosts, and a reserve system coupling apparatus wherein: each of said plurality of hosts requests one of the system coupling apparatuses to lock one of the inter-host shared resources, and stores lock information notified by the system coupling apparatus having locked the inter-host shared resource in compliance with the request; each of said plurality of system coupling apparatuses locks an inter-host shared resource whose locking has been requested by one of the hosts, holds lock information indicating that the inter-host shared resource has been locked, and notifies the requesting host of the lock information; one of said plurality of hosts, when one of said plurality of system coupling apparatuses fails, causes lock information held by other normal system coupling apparatuses to be deleted; and each of said plurality of hosts requests one of a plurality of system coupling apparatuses consisting of said other normal system coupling apparatuses plus said reserve system coupling apparatus to lock an inter-host shared resource on the basis of lock information stored in the requesting host.

A third recovery system for system coupling apparatuses according to the invention comprises a plurality of hosts, a plurality of coupling apparatuses for holding lock information on inter-host shared resources for common use by the plurality of hosts, and a reserve system coupling apparatus wherein: each of said plurality of hosts requests one of the system coupling apparatuses to lock one of the inter-host shared resources, and stores lock information notified by the system coupling apparatus having locked the inter-host shared resource in compliance with the request; each of said plurality of system coupling apparatuses locks an inter-host shared resource whose locking has been requested by one of the hosts, holds lock information indicating that the inter-host shared resource has been locked, and notifies the requesting host of the lock information; one of said plurality of hosts, when it recognizes that another system coupling apparatus has been newly connected, causes lock information held by previously provided system coupling apparatuses to be deleted; and each of said plurality of hosts requests one of a plurality of system coupling apparatuses consisting of said previously provided system coupling apparatuses plus said newly connected system coupling apparatus to lock an inter-host shared resource on the basis of lock information stored in the requesting host.

A fourth recovery system for system coupling apparatuses according to the invention comprises a plurality of hosts and a plurality of coupling apparatuses for holding lock information on inter-host shared resources for common use by the plurality of hosts, wherein: each of said plurality of hosts requests one of the system coupling apparatuses to lock one of the inter-host shared resources, and stores lock information notified by the system coupling apparatus having locked the inter-host shared resource in compliance with the request; each of said plurality of system coupling apparatuses locks an inter-host shared resource whose locking has been requested by one of the hosts, holds lock information indicating that the inter-host shared resource has been locked, and notifies the requesting host of the lock information and an identifier of its own; one of said plurality of hosts, when it recognizes that one of said plurality of system coupling apparatuses has failed, notifies other hosts of the failure; and each of said plurality of hosts, if it is holding lock information including an identifier of the faulty system coupling apparatus, requests one of said other normal system coupling apparatuses to lock an inter-host shared resource solely on the basis of that lock information.

A fifth recovery system for system coupling apparatuses according to the invention comprises a plurality of hosts, a plurality of coupling apparatuses for holding lock information on inter-host shared resources for common use by the plurality of hosts, and a reserve system coupling apparatus wherein: each of said plurality of hosts requests one of the system coupling apparatuses to lock one of the inter-host shared resources, and stores lock information notified by the system coupling apparatus having locked the inter-host shared resource in compliance with the request; each of said plurality of system coupling apparatuses locks an inter-host shared resource whose locking has been requested by one of the hosts, holds lock information indicating that the inter-host shared resource has been locked, and notifies the requesting host of the lock information and an identifier of its own; one of said plurality of hosts, when it recognizes that one of said plurality of system coupling apparatuses has failed, notifies other hosts of the failure; and each of said plurality of hosts, if it is holding lock information including an identifier of the faulty system coupling apparatus, requests one of a plurality of system coupling apparatuses consisting of said other normal system coupling apparatuses plus said reserve system coupling apparatus to lock an inter-host shared resource solely on the basis of that lock information.

A sixth recovery system for system coupling apparatuses according to the invention comprises a plurality of hosts and a plurality of coupling apparatuses for holding lock information on a plurality of inter-host shared resources to be accessed from application programs executed on the plurality of hosts, wherein: each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus; each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the host having issued the lock command of the lock information; one of said plurality of hosts, When one of said plurality of system coupling apparatuses fails, causes lock information held by other normal system coupling apparatuses to be deleted; and each of said plurality of hosts specifies, out of said other normal system coupling apparatuses, the system coupling apparatus to execute a hash function on an identifier of the inter-host shared resource contained in the lock information stored in itself to which a lock command is to be issued, and issues a lock command for the inter-host shared resource indicated by the lock information to the specified system coupling apparatus.

A seventh recovery system for system coupling apparatuses according to the invention comprises a plurality of hosts, a plurality of coupling apparatuses for holding lock information on a plurality of inter-host shared resources to be accessed from application programs executed on the plurality of hosts, and a reserve system coupling apparatus wherein: each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus; each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the host having issued the lock command of the lock information; one of said plurality of hosts, when one of said plurality of system coupling apparatuses fails, causes lock information held by other normal system coupling apparatuses to be deleted; and each of said plurality of hosts specifies, out of a plurality of system coupling apparatuses consisting of said other normal system coupling apparatuses plus said reserve system coupling apparatus, the system coupling apparatus to execute a hash function on an identifier of the inter-host shared resource contained in the lock information stored in itself to which a lock command is to be issued, and issues a lock command for the inter-host shared resource indicated by the lock information to the specified system coupling apparatus.

An eighth recovery system for system coupling apparatuses according to the invention comprises a plurality of hosts and a plurality of coupling apparatuses for holding lock information on inter-host shared resources to be accessed from application programs executed on the plurality of hosts, wherein: each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus; each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the host having issued the lock command of the lock information; one of said plurality of hosts, when it recognizes that another system coupling apparatus has been newly connected, causes lock information held by previously provided normal system coupling apparatuses to be deleted; and each of said plurality of hosts specifies, out of a plurality of system coupling apparatuses consisting of said previously provided system coupling apparatuses plus said newly connected system coupling apparatus, the system coupling apparatus to execute a hash function on an identifier of the inter-host shared resource contained in the lock information stored in itself to which a lock command is to be issued, and issues a lock command for the inter-host shared resource indicated by the lock information to the specified system coupling apparatus.

A ninth recovery system for system coupling apparatuses according to the invention comprises a plurality of hosts and a plurality of coupling apparatuses for holding lock information on inter-host shared resources to be accessed from application programs executed on the plurality of hosts, wherein: each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus; each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the host having issued the lock command of the lock information and an identifier of its own; one of said plurality of hosts, when it recognizes that one of said plurality of system coupling apparatuses has failed, notifies other hosts of the failure; and each of said plurality of hosts, if it is holding lock information including an identifier of the faulty system coupling apparatus, specifies, out of said other normal system coupling apparatuses, the one to become the destination of a lock command by executing a hash function on the identifier of the inter-host shared resource contained in that lock information stored in itself, and issues the lock command for the inter-host shared resource indicated by the lock information to the specified system coupling apparatus.

A tenth recovery system for system coupling apparatuses according to the invention comprises a plurality of hosts, a plurality of coupling apparatuses for holding lock information on a plurality of inter-host shared resources to be accessed from application programs executed on the plurality of hosts, and a reserve system coupling apparatus wherein: each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus; each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the requesting host of the lock information and its own identifier; one of said plurality of hosts, when it recognizes that one of said plurality of system coupling apparatuses has failed, notifies other hosts of the failure; and each of said plurality of hosts, if it is holding lock information including an identifier of the faulty system coupling apparatus, specifies, out of a plurality of system coupling apparatuses consisting of said other normal system coupling apparatuses plus said reserve system coupling apparatus, the system coupling apparatus to become the destination of a lock command by executing a hash function on the identifier of the inter-host shared resource contained in that lock information stored in itself, and issues a lock command for the inter-host shared resource indicated by the lock information to the specified system coupling apparatus.

A first recording medium according to the invention records thereon a program for causing: each of a plurality of hosts to perform processing to request one of a plurality of coupling apparatuses to lock one of inter-host shared resources for common use by said plurality of hosts; each of said plurality coupling apparatuses to lock an inter-host shared resource as requested by one of the hosts, to hold lock information indicating that the inter-host shared resource has been locked; and to perform processing to notify the requesting host of the lock information; each of said plurality of hosts to perform processing to store the lock information notified by the system coupling apparatus; one of said plurality of hosts, when one of said plurality of system coupling apparatuses f ails, to delete lock information held by other normal system coupling apparatuses; and each of said plurality of hosts to perform processing to request one of said plurality of other normal system coupling apparatuses to lock an inter-host shared resource on the basis of lock information stored in the requesting host.

A second recording medium according to the invention records thereon a program for causing each of a plurality of hosts to perform processing to request one of a plurality of coupling apparatuses to lock one of inter-host shared resources for common use by said plurality of hosts, to lock an inter-host shared resource as requested by one of the hosts, and to hold lock information indicating that the inter-host shared resource has been locked; causing each of said plurality of said system coupling apparatuses to perform processing to notify the requesting host of the lock information; causing each of said plurality of hosts to perform processing to store the lock information notified by the system coupling apparatus; causing one of said plurality of hosts, when one of said plurality of system coupling apparatuses fails, to delete lock information held by other normal system coupling apparatuses; and causing each of said plurality of hosts to perform processing to request one of a plurality of system coupling apparatuses consisting of said other normal system coupling apparatuses plus a reserve system coupling apparatus to lock an inter-host shared resource soon he basis of lock information stored in the requesting host.

A third recording medium according to the invention records thereon a program for causing each of a plurality of hosts to perform processing to request one of a plurality of coupling apparatuses to lock one of inter-host shared resources for common use by said plurality of hosts, to lock an inter-host shared resource as requested by one of the hosts, and to hold lock information indicating that the inter-host shared resource has been locked; causing each of said plurality of said system coupling apparatuses to perform processing to notify the requesting host of the lock information; causing each of said plurality of hosts to perform processing to store the lock information notified by the system coupling apparatus; causing one of said plurality of hosts, when it recognizes that another system coupling apparatus has been newly connected, to delete lock information held by previously provided normal system coupling apparatuses; and causing each of said plurality of hosts to perform processing to request one of a plurality of system coupling apparatuses consisting of said previously provided system coupling apparatuses plus said newly connected system coupling apparatus to lock an inter-host shared resource on the basis of lock information stored in the requesting host.

A fourth recording medium according to the invention records thereon a program for causing each of a plurality of hosts to perform processing to request one of a plurality of coupling apparatuses to lock one of inter-host shared resources for common use by said plurality of hosts, to lock an inter-host shared resource as requested by one of the hosts, and to hold lock information indicating that the inter-host shared resource has been locked; causing each of said plurality of said system coupling apparatuses to perform processing to notify the requesting host of the lock information and an identifier of its own; causing each of said plurality of hosts to perform processing to store the lock information notified by the system coupling apparatus; causing one of said plurality of hosts, when it recognizes that one of said plurality of system coupling apparatuses has failed, to notify other hosts of the failure; and causing each of said plurality of hosts, if it is holding lock information including an identifier of the faulty system coupling apparatus, to perform processing to request one of said plurality of other normal system coupling apparatuses to lock an inter-host shared resource solely on the basis of that lock information.

A fifth recording medium according to the invention records thereon a program for causing each of a plurality of hosts to perform processing to request one of a plurality of coupling apparatuses to lock one of inter-host shared resources for common use by said plurality of hosts, to lock an inter-host shared resource as requested by one of the hosts, and to hold lock information indicating that the inter-host shared resource has been locked; causing each of said plurality of said system coupling apparatuses to perform processing to notify the requesting host of the lock information and an identifier of its own; causing each of said plurality of hosts to perform processing to store the lock information notified by the system coupling apparatus; causing one of said plurality of hosts, when it recognizes that one of said plurality of system coupling apparatuses has failed, to notify other hosts of the failure; and causing each of said plurality of hosts, if it is holding lock information including an identifier of the faulty system coupling apparatus, to perform processing to request one of a plurality of system coupling apparatuses consisting of said other normal system coupling apparatuses plus a reserve system coupling apparatus to lock an inter-host shared resource solely on the basis of that lock information.

A first group of recording media according to the invention records said program divided into a plurality of parts, each part being recorded on one or another of first through fifth recording media.

BRIEF DESCRIPTION OF THE DRAWINGS

The present invention will be understood more fully from the detailed description given below and from the accompanying drawings of preferred embodiments of the invention, which, however, should not be regarded as limiting the scope of the invention but as being intended only for explanation and facilitation of understanding.

Here, it should be noted that like reference numerals represent like elements throughout the disclosure.

DETAILED DESCRIPTION OF THE PREFERRED EMBODIMENTS

Preferred embodiments of the present invention will be described in detail below with reference to the drawings.

Figure 1:
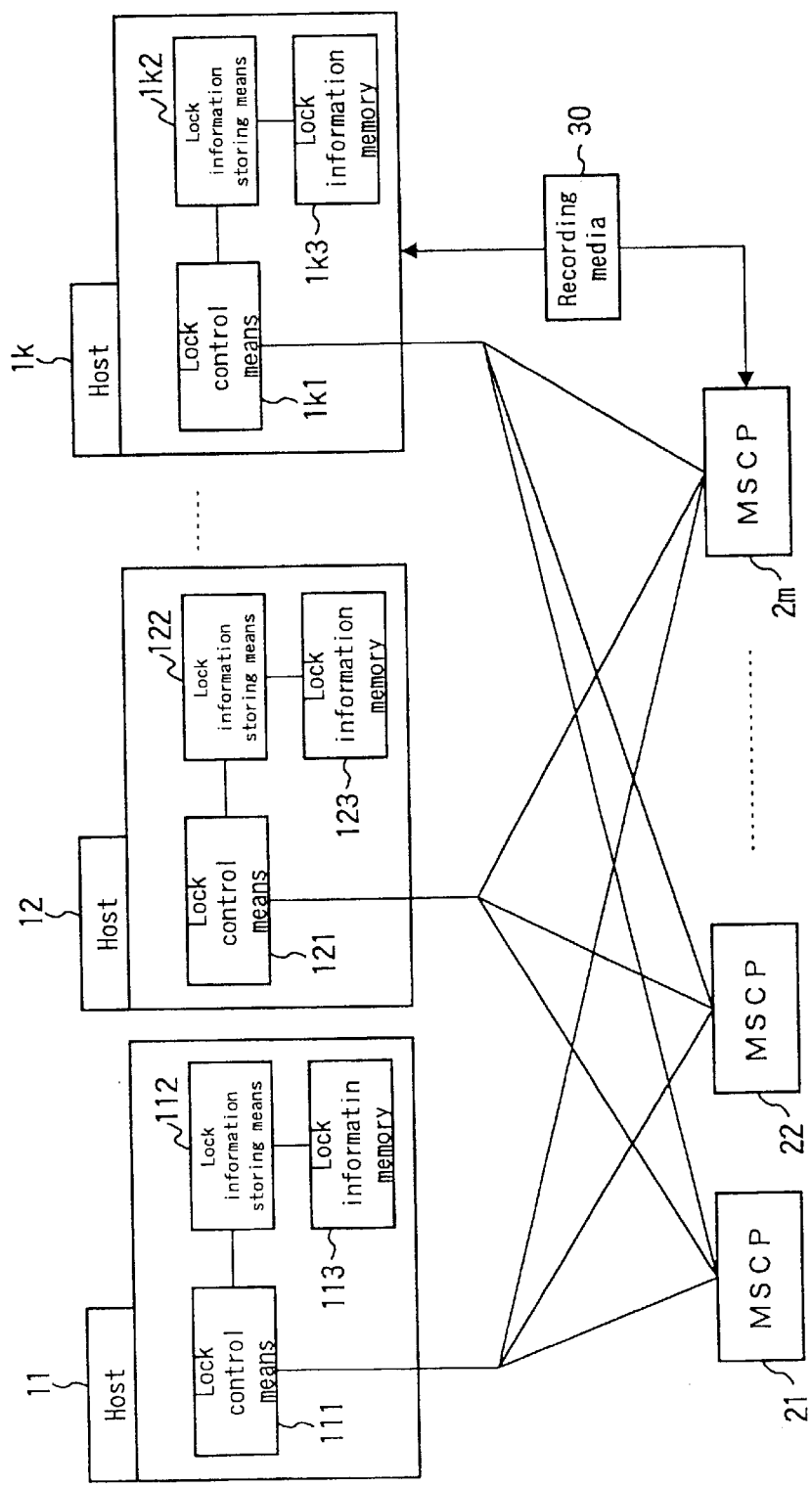
FIG. 1 is a block diagram illustrating the configuration of a first preferred embodiment of the invention.

Referring to FIG. 1, a first preferred embodiment of the invention is a computer system consisting of hosts 11, 12, . . . , $1k$ operating under programmed control and MSCPs 21, 22, . . . , $2m$ for coupling these hosts 11, 12, . . . , $1k$. It has two or more MSCPs.

As a variation of this first embodiment or any of second through fourth embodiments to be described below, the hosts 11, 12, . . . , $1k$ and the MSCPs 21, 22, . . . , $2m$ may as well be connected to a recording medium 30 such as a magnetic disk unit or a semiconductor memory by signal lines, so that the hosts 11, 12, . . . , $1k$ and the MSCPs 21, 22, . . . , $2m$ execute the following sequence of processing under a program loaded via the signal lines from the recording medium 30.

The hosts 11, 12, . . . , $1k$ respectively comprise lock control means 111, 121, . . . , $1k1$(hereinafter generically referred to as a lock control means $1n1$), lock information storing means 112, 122, . . . , $1k2$(hereinafter generically referred to as a lock information storing means $1n2$) and lock information memories 113, 123, . . . , $1k3$ (hereinafter generically referred to as a lock information memory $1n3$).

A lock control means $1n1$ issues, in response to a lock request or an unlock request issued by an AP, executed on one of the hosts 11, 12, . . . , $1k$ to exclusively control an inter-host shared resource (not shown), a lock command or an unlock command, respectively corresponding to the lock request or the unlock request, to one of the MSCPs 21, 22, . . . , $2m$.

A lock information storing means 1n2 updates lock information stored in a lock information memory 1n3 on the basis of the result of execution of the lock command or the unlock command, issued by the lock control means 1n1 to one of the MSCPs 21, 22, . . . , 2m, as it is returned from the MSCP 21, 22, . . . , or 2m.

Next will be described the operation of the first preferred embodiment of the invention.

Figure 2:
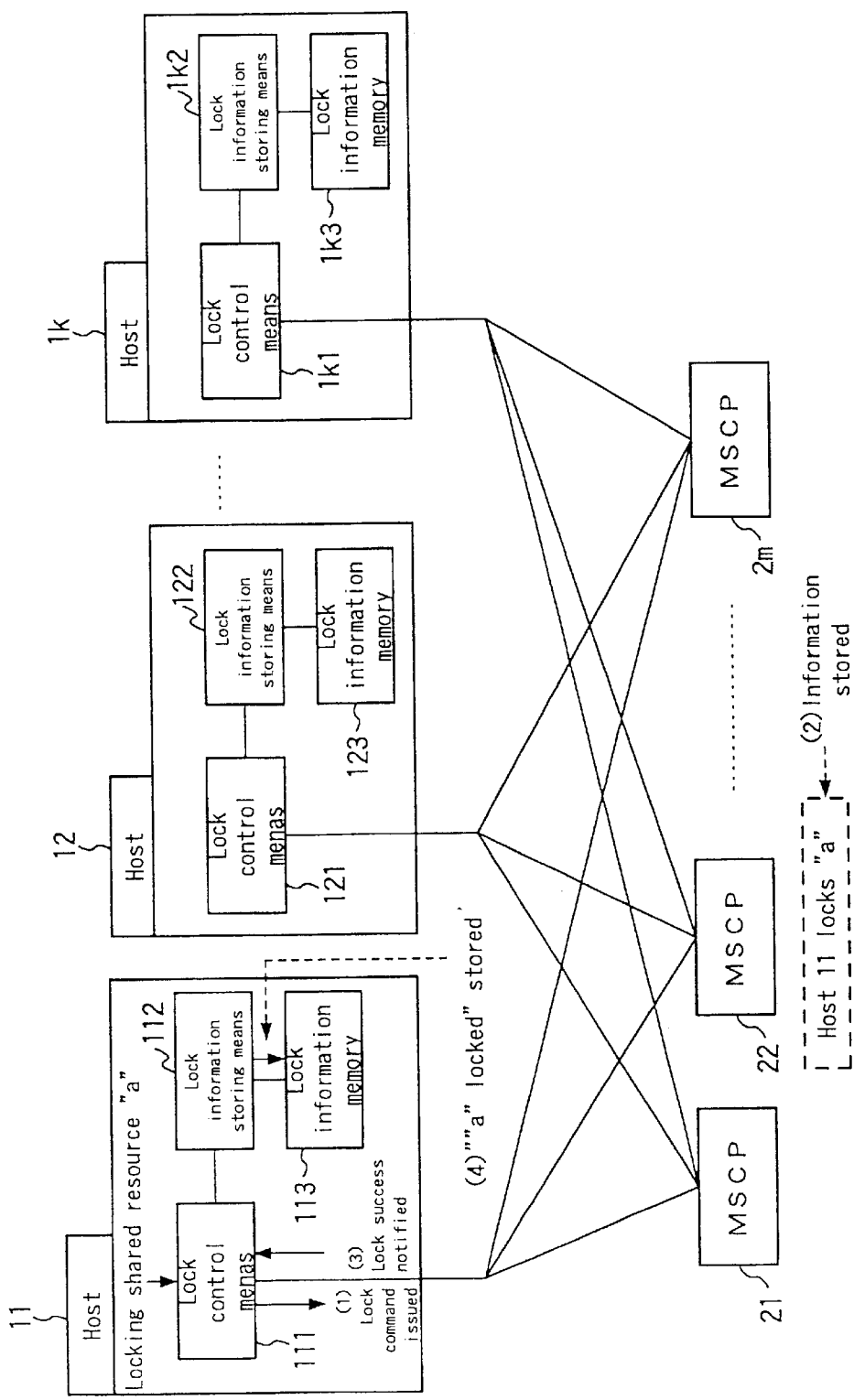
FIG. 2 illustrates a state wherein an inter-host shared resource is locked by a lock command issued by a lock control means $1n1$.
Figure 3:
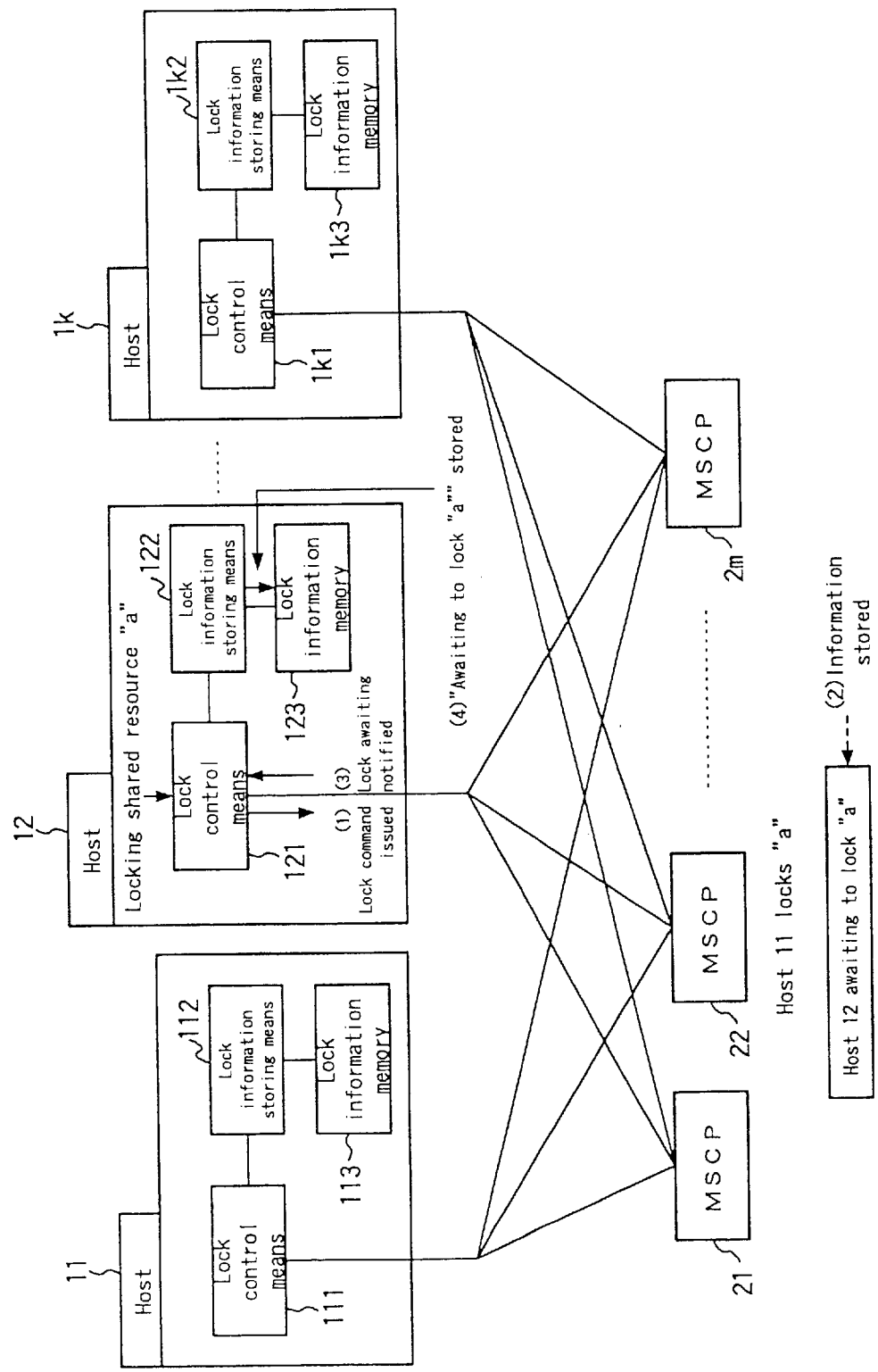
FIG. 3 illustrates a state wherein, in the first preferred embodiment of the invention, an inter-host shared resource, intended to be locked by a lock command issued by the lock control means $1n1$, has already been locked by a lock command issued by another lock control means $1n1$.

First, the operation that takes place when a lock control means 1n1 issues a lock command for an inter-host shared resource will be described with reference to FIGS. 2 and 3. FIG.2 illustrates a state wherein an inter-host shared resource is locked by a command issued by the lock control means 1n1. FIG. 3 illustrates a state wherein the inter-host shared resource intended to be locked by the lock command issued by the lock control means 1n1 has already been locked by another lock command issued by another lock control means 1n1.

When an AP executed on the host 11 issues a lock request for an inter-host shared resource a, the lock control means 111 issues a lock command to an MSCP (FIG. 2(1)). Any one of the MSCP may be determined to be the one to which this lock command is to be issued by executing a hash function on an identifier, e.g. the identification number, of the inter-host shared resource. In this embodiment, it is supposed that a lock command is issued to the MSCP 22. The MSCP 22, receiving the lock command, confirms that there is no host having locked the inter-host shared resource a, locks the inter-host shared resource a, stores the information that "the host 11 has locked the inter-host shared resource a" (FIG. 2(2)), and notifies the host 11 of successful execution of the lock command (FIG. 2(3)) The lock control means 111, upon receiving the notification of the successful execution of the lock command, causes the lock information storing means 112 to store the information that "the inter-host shared resource a has been locked" into the lock information memory 113 (FIG. 2(4)).

Then, when an AP executed on the host 12 issues a lock request for the same inter-host shared resource a, the lock control means 121 issues a lock command to the MSCP 22 (if a hash function is executed on an identifier of the same inter-host shared resource, the same MSCP is selected unless there is a change in MSCP configuration) (FIG. 3(1)). The MSCP 22, receiving the lock command, confirms that the inter-host shared resource a is already locked by the host 11, holds this lock command from execution, stores the information that "the host 12 is waiting for locking of the inter-host shared resource a" (FIG. 3(2)), and notifies the host 12 that execution of the lock command is awaited (FIG. 3(3)). The lock control means 121, upon receiving the notification that execution of the lock command is awaited, causes the lock information storing means 122 to store the information that "locking of the inter-host shared resource a" is awaited" into the lock information memory 123 (FIG. 3(4)).

Next, the operation that takes place when a lock control means 1n1 issues an unlock command for an inter-host shared resource will be described with reference to FIGS. 3 and 4.

Figure 4:
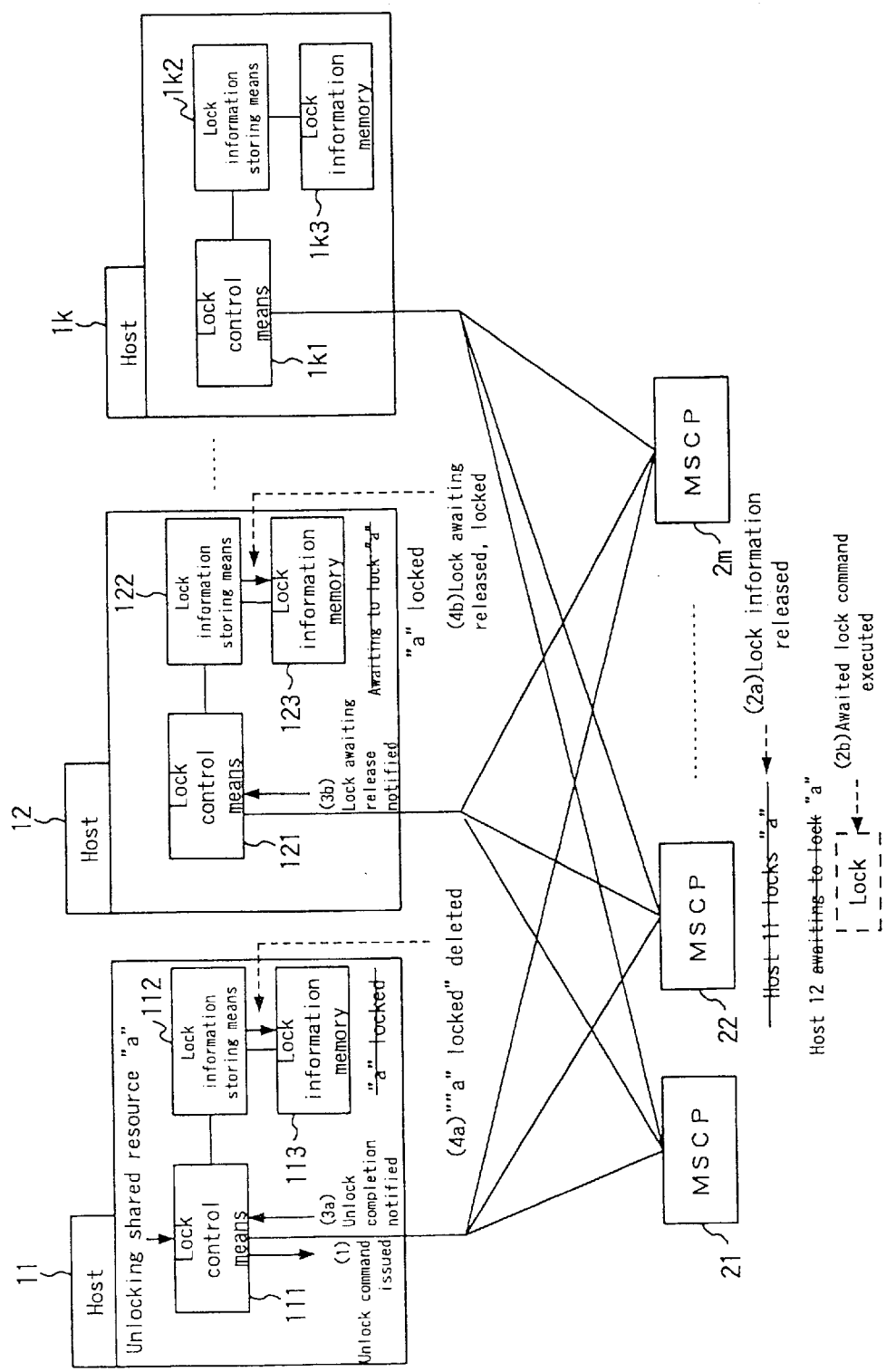
FIG. 4 illustrates a state wherein, in the first embodiment of the invention, a lock control means $1n1$ has issued a command to unlock an inter-host shared resource.

When, in the state of FIG. 3, an AP executed on the host 11 issues an unlock request for the inter-host shared resource a, the lock control means 111 issues an unlock command to the MSCP 22 (if a hash function is executed on an identifier of the same inter-host shared resource, the same MSCP is selected unless there is a change in MSCP configuration) (FIG. 4(1)) The MSCP 22, receiving the unlock command, deletes the information that "the host 11 has locked the inter-host shared resource a" stored in itself (FIG. 4(2a)), and notifies the host 11 of successful execution of the unlock command (FIG. 4 (3a)). The lock control means 111, upon receiving the notification of the successful execution of the unlock command, causes the lock information storing means 112 to delete the information that "the inter-host shared resource a has been locked" from the lock information memory 113 (FIG. 4(4a)).

Meanwhile the MSCP 22, as it stores the information that "the host 12 is waiting for locking of the inter-host shared resource a," locks the inter-host shared resource a by executing the lock command issued by the host 12 for the inter-host shared resource a after notifying the host 11 of the successful execution of the unlock command. As a result, the MSCP 22 deletes the information that "the host 12 is waiting for locking of the inter-host shared resource a" stored in itself, newly stores the information that "the host 12 has locked the inter-host shared resource a" (FIG. 4(2b)), and notifies the host 12 of the successful execution of the lock command (FIG. 4 (3b)). The lock control means 121, upon receiving the notification of the successful execution of the lock command, causes the lock information storing means 122 to replace the information that "locking of the inter-host shared resource a is awaited" stored in the lock information memory 123 with the information that "the inter-host shared resource a has been locked" (FIG. 4(4b)).

Finally, the operation that takes place in the event of an MSCP failure will be described with reference to FIGS. 5 through 9.

Figure 5:
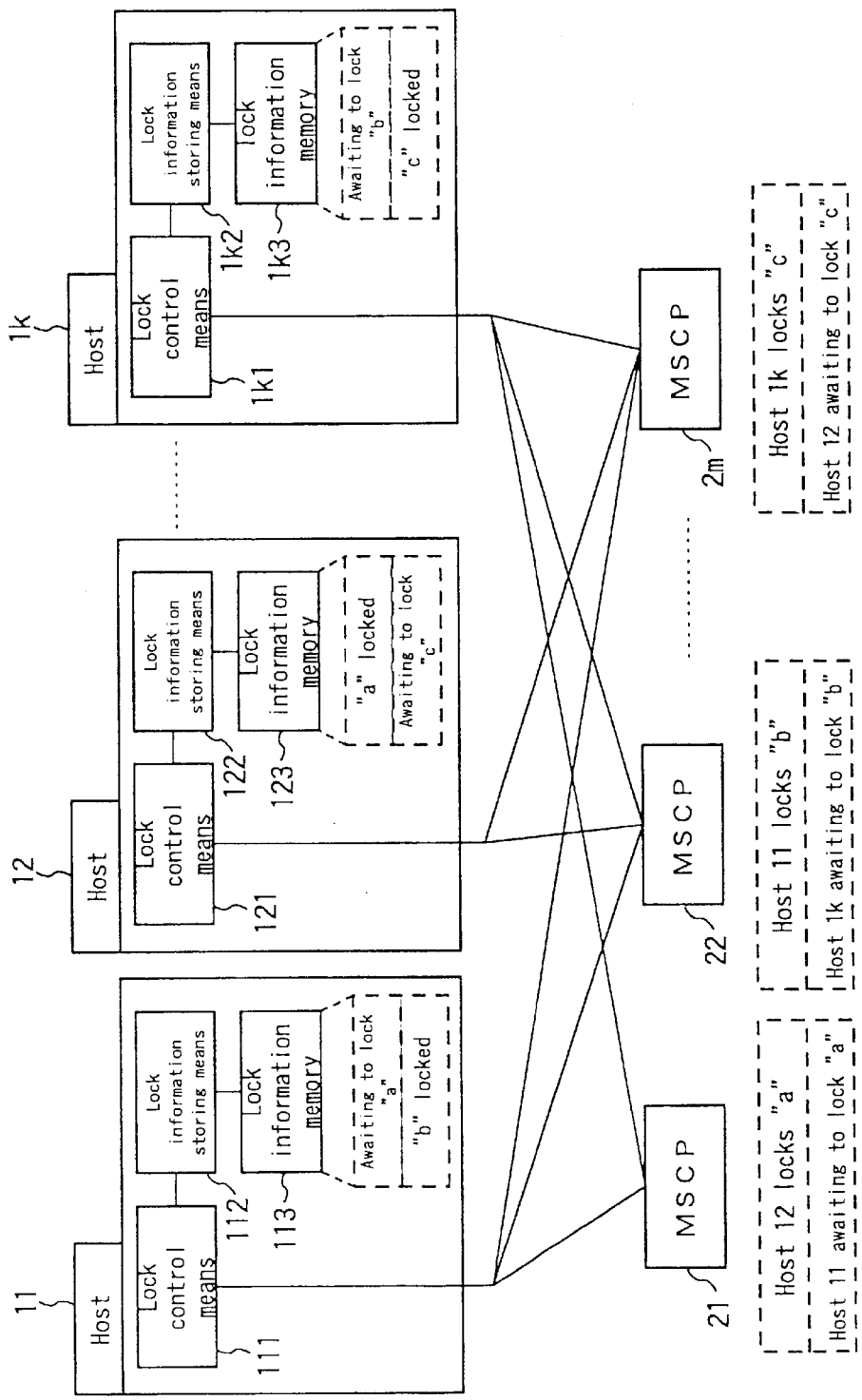
FIG. 5 illustrates a state of recovery processing by an MSCP in the first embodiment of the invention.

Referring to FIG. 5, it is supposed that the inter-host shared source a is locked by the host 12 with the host 11 awaiting to lock it, an inter-host shared source b is locked by the host 11 with the host 1k awaiting to lock it, and an inter-host shared source c is locked by the host 1k with the host 12 awaiting to lock it. A case in which an MSCP (the MSCP 22 in this particular embodiment) fails in this state.

Figure 6:
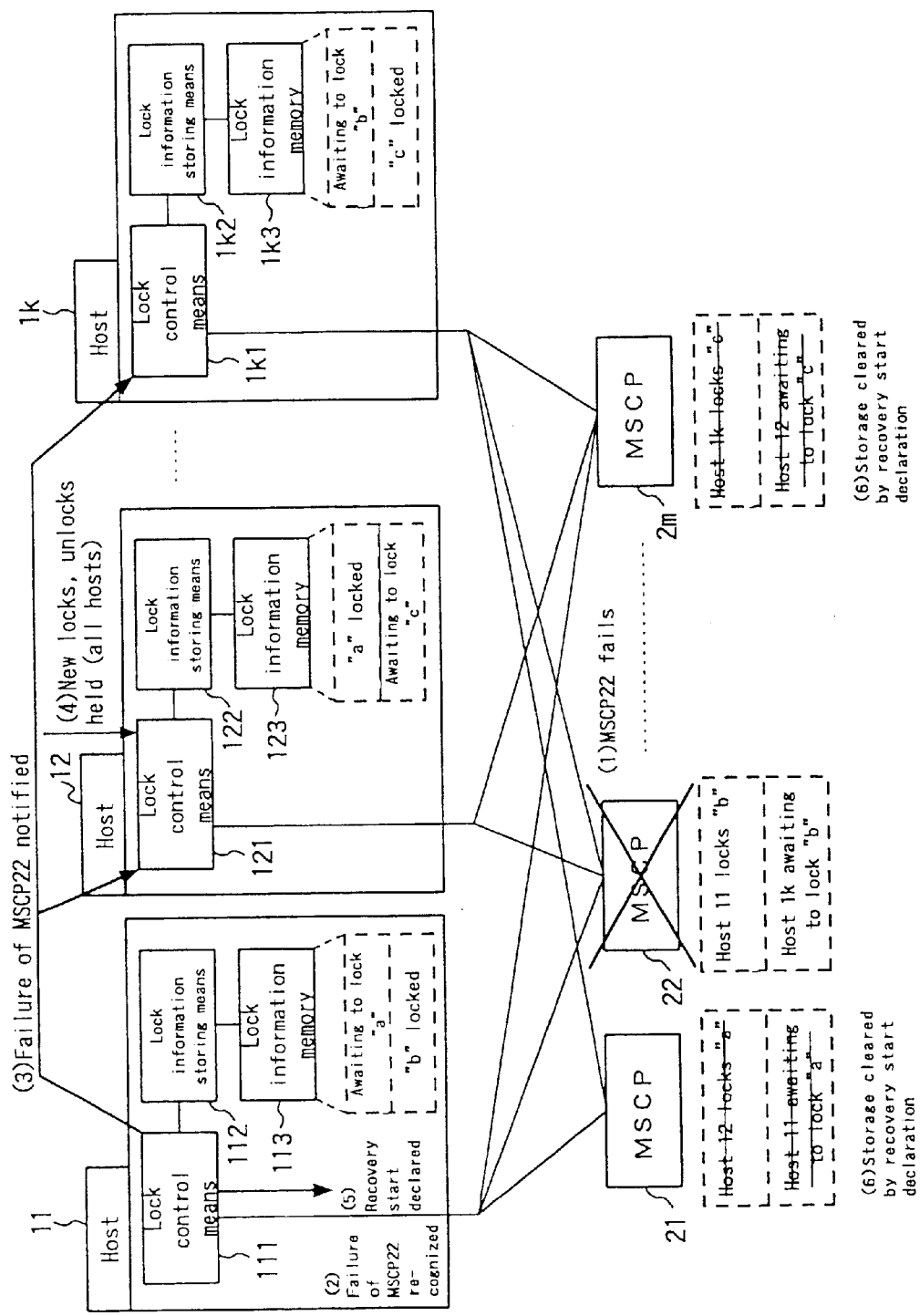
FIG. 6 illustrates another state of recovery processing by an MSCP in the first embodiment of the invention.

The lock control means 111 of a host (the host 11 in this particular embodiment), when it detects the failure of the MSCP 22 (FIG. 6(2)), notifies all other hosts of the failure (FIG. 6 (3)). The lock control means 111 of the host having made that notification and the lock control means of all the other hosts having received the notification, even if a lock request or an unlock request for any inter-host shared resource is issued from an AP executed on any of the hosts, will issue neither a lock nor an unlock command, and hold themselves from lock or unlock processing on any inter-host shared resource (FIG. 6(4)). This causes the system to be suspended from operation temporarily, and the execution of any AP to access any MSCP is also suspended temporarily. The lock control means 111 of the representative host 11 declares the start of recovery processing to every MSCP not in trouble (FIG. 6(5)). Every MSCP having received this declaration deletes all the lock information stored in itself (this action is known as "initialization") (FIG. 6(6)).

Figure 7:
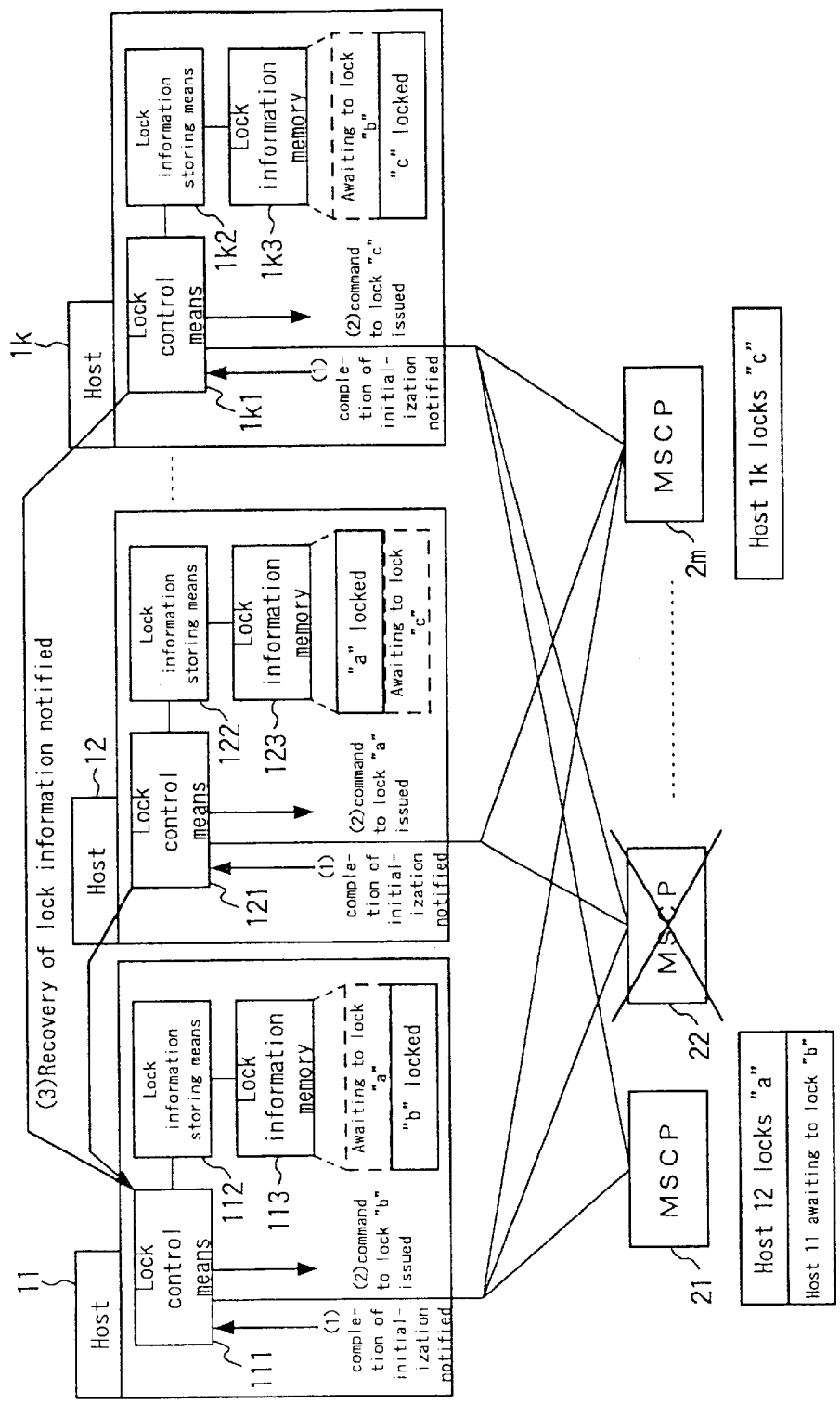
FIG. 7 illustrates still another state of recovery processing by an MSCP in the first embodiment of the invention.

The lock control means 111 of the representative host 11, upon completion of the initialization of every normal MSCP, delivers the notice of completion of MSCP initialization to the lock control means 1n1 of all the other hosts (FIG. 7(1)). Each of the lock control means 111 of the representative host 11 and the lock control means 1n1 of all the other hosts so notified issues a lock command to one of the normal MSCPs on the basis of the information, out of the items of information stored in the lock control information memories 1n3, that the pertinent host has locked an inter-host shared resource (FIG. 7(2)). Any one of the MSCP may be determined to be the one to which this lock command is to be issued by executing a hash function on an identifier, e.g. the identification number, of the inter-host shared resource. The lock control means 1n1 of every one of the other hosts, having issued a lock command, notifies the lock control means ill of the representative host 11 of the completion of the recovery of lock information (FIG. 7(3)).

Figure 8:
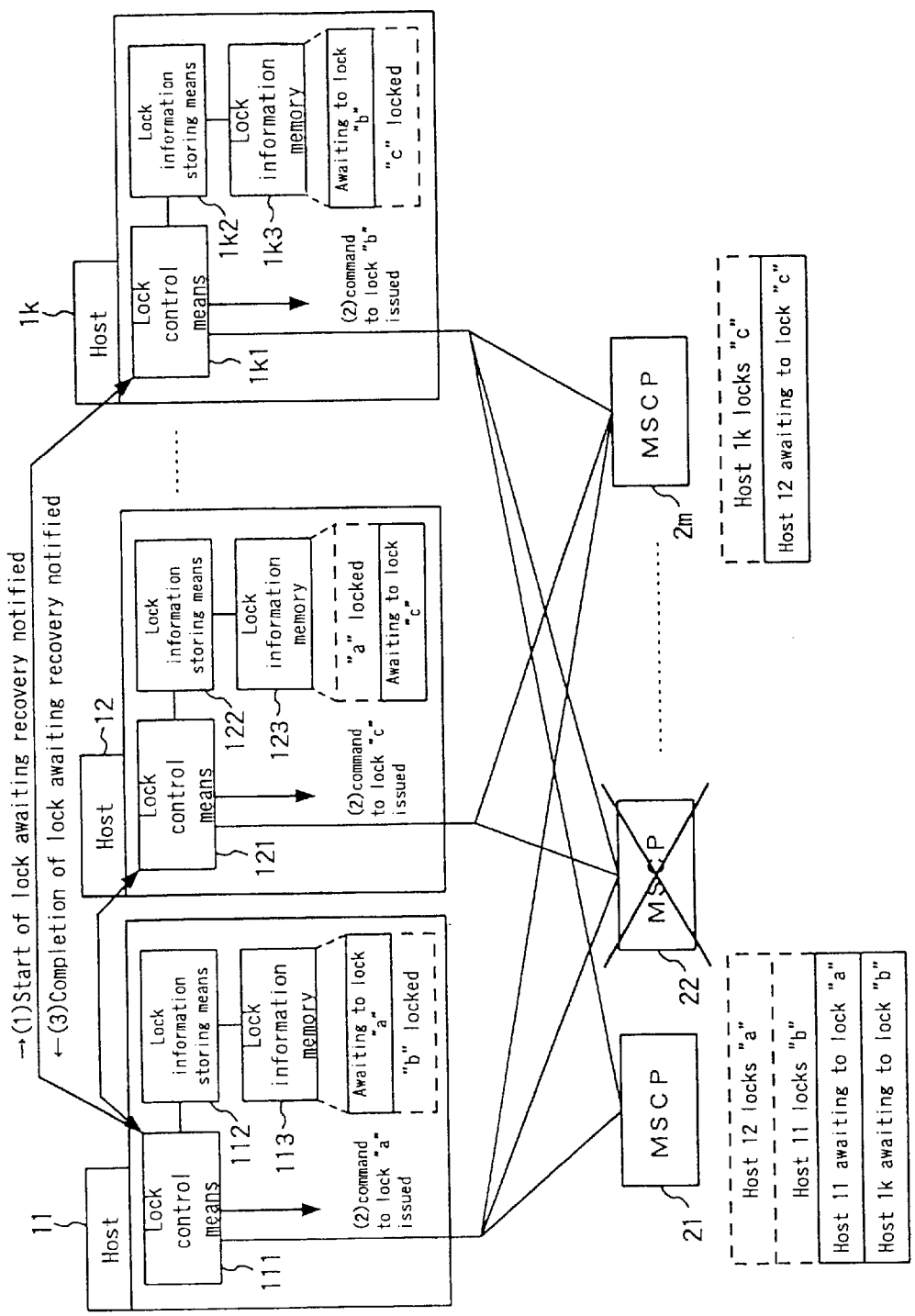
FIG. 8 illustrates yet another state of recovery processing by an MSCP in the first embodiment of the invention.

The lock control means 111 of the representative host 11, upon receipt of the notification from the lock control means 1n1 of all the other hosts that the recovery of lock information has been completed, notifies the lock control means 1n1 of all the other hosts that the recovery of lock awaiting information is started (FIG. 8(1)). The lock control means 111 of the representative host 11, having given this notification, issues a lock command to an MSCP on the basis of lock awaiting information stored in the lock information memory 1n3 (FIG. 8(2)). In this case, too, any one of the MSCP may be determined to be the one to which the lock command is to be issued by executing a hash function on an identifier, e.g. the identification number, of the inter-host shared resource. The lock control means 1n1 of every one of the other hosts, having recovered all the items of lock awaiting information, notifies the lock control means 111 of the representative host 11 of the completion of the recovery of lock awaiting information (FIG. 8(3)).

Figure 9:
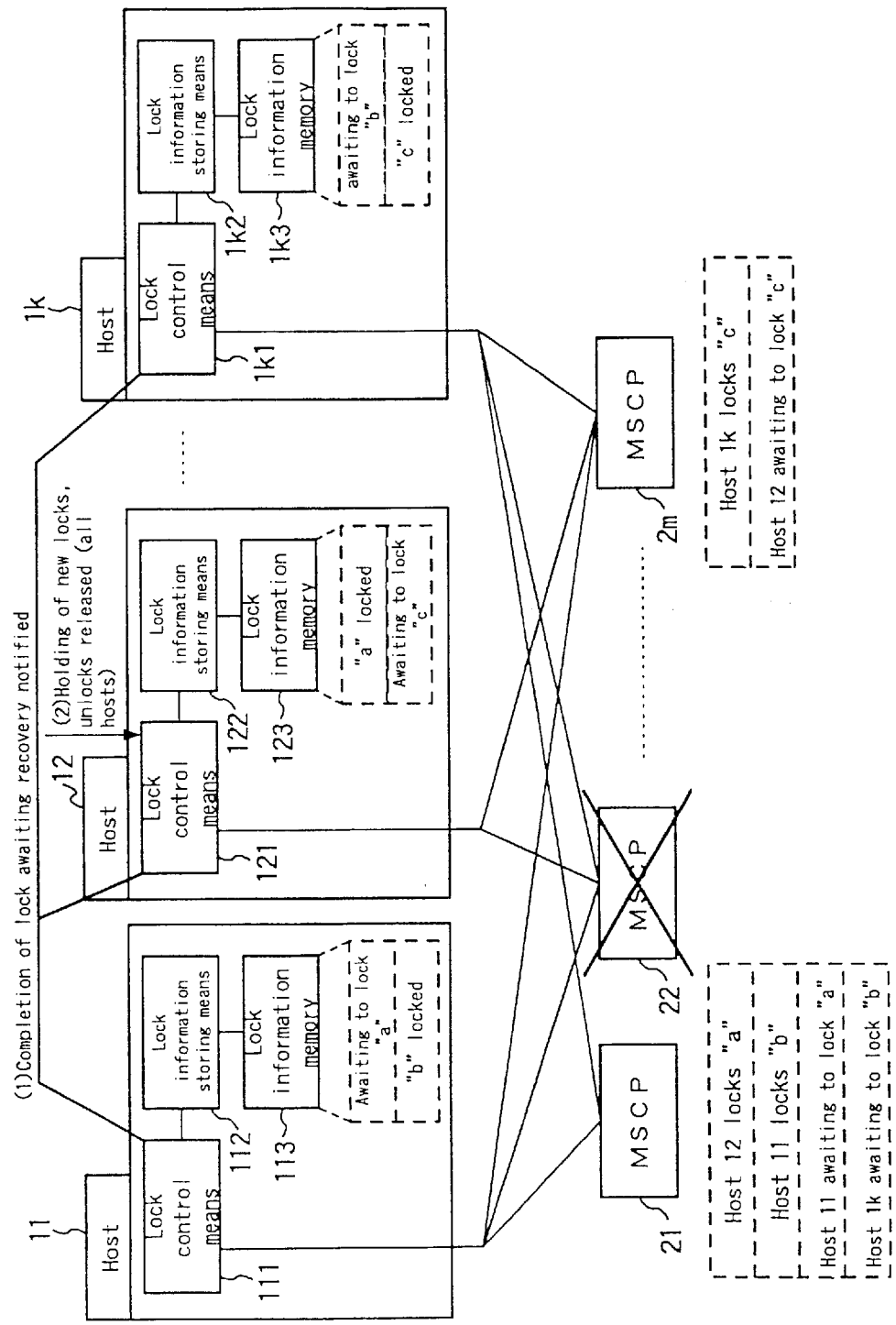
FIG. 9 illustrates a still another state of recovery processing by an MSCP in the first embodiment of the invention.

The lock control means 111 of the representative host 11, upon receipt of the notification from the lock control means 1n1 of all the other hosts that the recovery of lock awaiting information has been completed, notifies the lock control means 1n1 of all the other hosts that the lock control is resumed (FIG. 9(1)) Each of the lock control means 111 of the representative host 11 and the lock control means 1n1 of all the other hosts resumes acceptance, from an AP to be executed in its host, of a lock or an unlock request for an inter-host shared resource (FIG. 9(2)). This results in resumption of the temporarily suspended operation of the system. Thus is completed the operation of the first preferred embodiment of the present invention.

The first embodiment of the invention has the benefit of being able, in the event of failure of any MSCP, to let the computer system continue its operation, without having to wait for the restoration of the MSCP in trouble, by re-transmitting the lock information held by each host to other MSCPs.

Next will be described a second preferred embodiment of the invention. The second embodiment is a version of the computer system of the first embodiment with the additional presence of a reserve MSCP. Processing by this embodiment, where it differs from the first embodiment, will be described with reference to FIG. 10. In this second embodiment, the number of MSCPs excluding the reserve unit need not be more than one.

Figure 10:
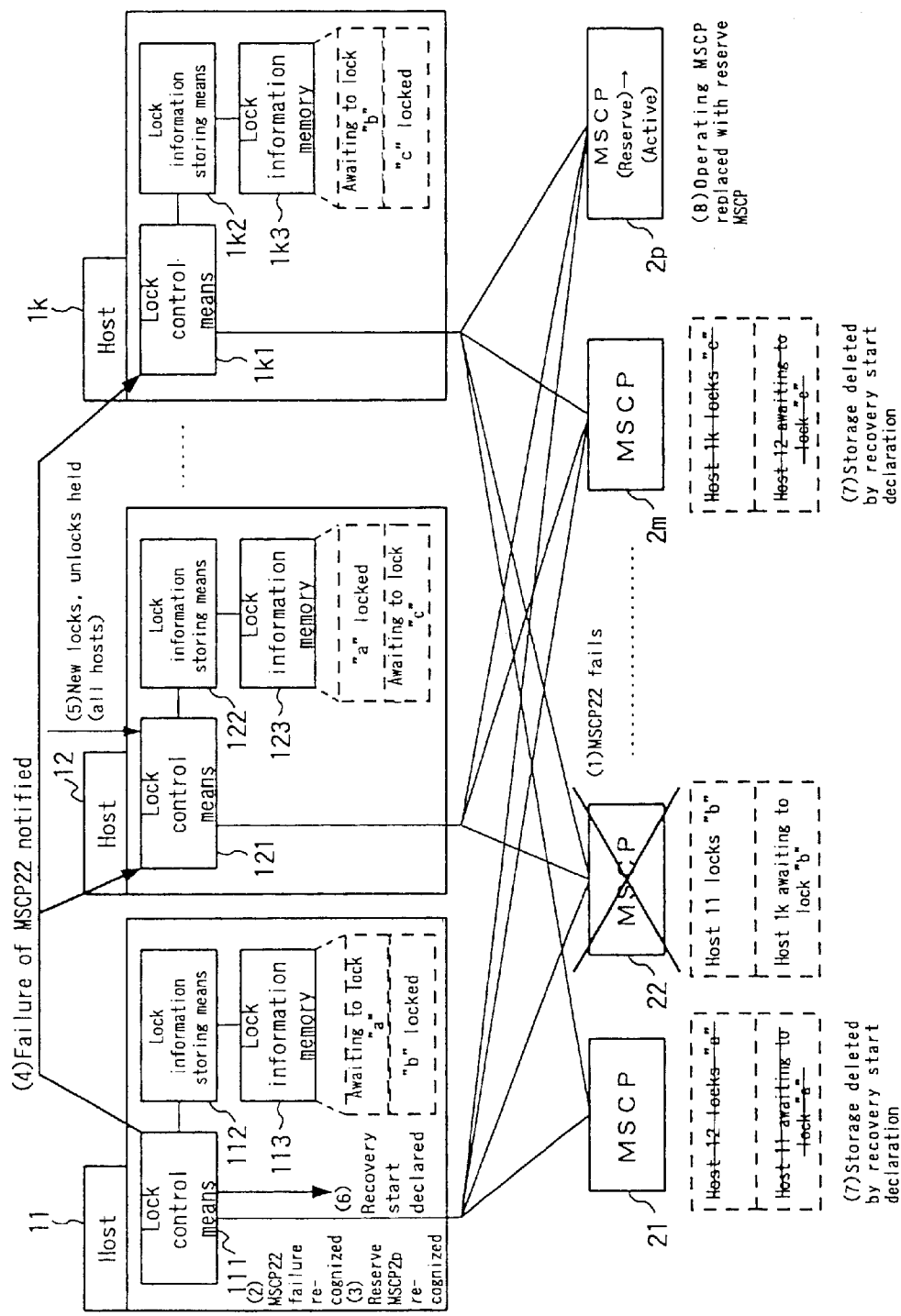
FIG. 10 illustrates a state of recovery processing by an MSCP in a second embodiment of the invention.

When failure of any MSCP (the MSCP 22 in this particular embodiment) (FIG. 10(1)) is recognized by the lock control means 111 of a host (the host 11 (which serves as the representative host) in this particular embodiment) (FIG. 10(2)), the lock control means 111 checks whether or not a reserve MSCP is present in the computer system (FIG. 10(3)). In this embodiment, a reserve MSCP 2p is supposed to be present. As in the first embodiment, every other host is notified of the failure of the MSCP 22 (FIG. 10(4)), and holds lock processing and unlock processing for any inter-host shared resources from execution (FIG. 10(5)). The lock control means 111 of the host 11 issues a recovery start declaration to the other MSCPs than that in trouble (FIG. 10(6)) and, as in the first embodiment, initializes the information held by the other MSCPs than that in trouble (FIG. 10(7)). Further, the reserve MSCP 2p is added to the other MSCPs than that in trouble, and lock information and lock awaiting information in these MSCPs are recovered. Here, the MSCP to which a lock command is to be issued is selected from the other MSCPs than that in trouble and the reserve MSCP 2p, and the choice is determined by executing a hash function on an identifier, e.g. the identification number, of an inter-host shared resource.

Thus is completed the operation of the second preferred embodiment of the present invention.

The second embodiment of the invention, as does the first embodiment, has the benefit of being able, in the event of failure of any MSCP, to let the computer system continue its operation, without having to wait for the restoration of the MSCP in trouble, by re-transmitting the lock information held by each host to other MSCPs, and the further benefit of being able to maintaining the performance level pertaining to MSCP lock processing before the occurrence of the failure because it has a reserve MSCP in addition to the first embodiment and therefore recovers lock information or lock awaiting information with no change in the number of available MSCPs.

Figure 11:
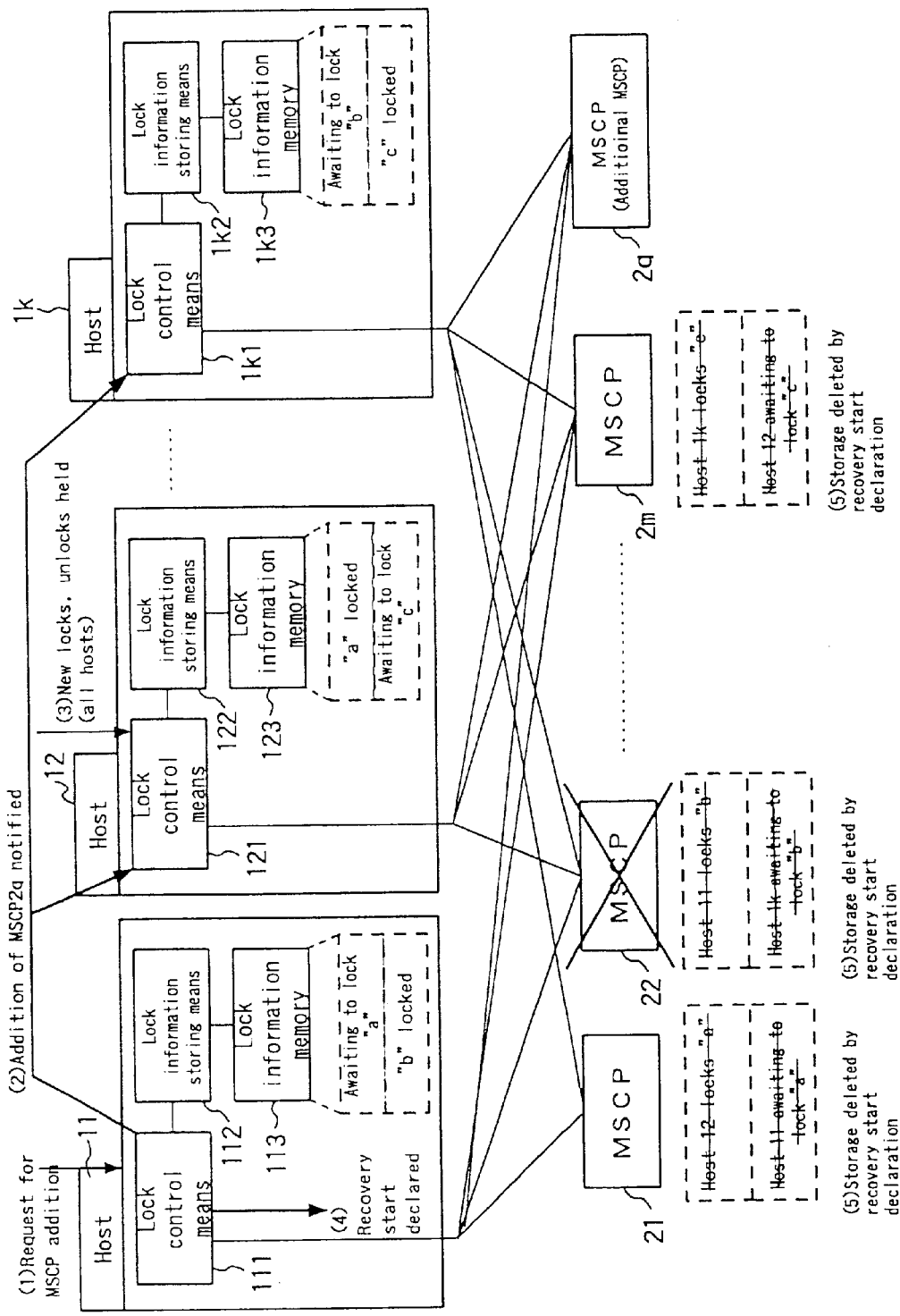
FIG. 11 illustrates a state of recovery processing by an MSCP in a third embodiment of the invention.

Next will be described a third preferred embodiment of the invention. The third embodiment is a version of the computer system of the first embodiment with the addition of another MSCP. Processing by this embodiment, where it differs from the first embodiment, will be described with reference to FIG. 11. In this third embodiment, the number of MSCPs excluding the additional unit need not be more than one.

While MSCP recovery processing is triggered in the first embodiment by the occurrence of MSCP failure, the addition of an MSCP in this embodiment triggers processing to reconfigure lock information stored in MSCPs. When the lock control means of any one lock control means 111 of a host (the host 11 (which serves as the representative host) in this particular embodiment) recognizes the additional connection of the MSCP 2q (FIG. 11(1)), this lock control means 111, as in the first embodiment, notifies other hosts of the addition of the MSCP 2q (FIG. 11(2)), these hosts hold lock processing and unlock processing for any inter-host shared resources from execution (FIG. 11(3)). The lock control means 111 of the host 11 issues a recovery start declaration to all the MSCPs (FIG. 11(4)), and initializes the information held by all those MSCPs (FIG. 11 (5)). Further, lock information and lock awaiting information in all the MSCPs including the MSCP 2q are recovered. Here, the MSCP to which a lock command is to be issued is selected from all the other MSCPs including the MSCP 2q, and the choice is determined by executing a hash function on an identifier, e.g. the identification number, of an inter-host shared resource.

Thus is completed the operation of the third preferred embodiment of the present invention.

In this third embodiment of the invention, the trigger, unlike in the first embodiment where it is MSCP failure, is the new addition of an MSCP to the computer system, and lock processing is performed with the lock information held by every MSCP before the addition being distributed after the addition among the MSCPs whose total number has increased by one, resulting in the benefit of enhancing the performance level of the MSCPs pertaining to lock processing.

Next will be described a fourth preferred embodiment of the present invention with respect to its differences from the first and second embodiments.

Each MSCP, while storing the information that "the host 1k has locked the inter-host shared resource x" when the inter-host shared resource is locked, notifies the host 1k of the successful execution of the lock command and an identifier of its own.

The lock control means 111 of any host (the host 11 (which serves as the representative host) in this particular embodiment), upon detection of failure in any MSCP (the MSCP 22 in this particular embodiment), notifies all the other hosts of the failure.

While the lock control means 1n1 of every host would be restrained hereupon from locking or unlocking any inter-host shared resource and every MSCP would be caused to delete any lock information it is holding in the first and second preferred embodiments, this embodiment is characteristic in that normally operating MSCPs are not caused to delete any lock information they are holding, but only the lock information pertaining to the MSCP 22 in trouble is recovered.

Thus, the lock control means 111 of the representative host 11 and the lock control means 1n1 of all the other hosts, if any information pertaining to the MSCP 22 in trouble (assigned the ID number of the MSCP 22) is contained in the information stored in the lock control information memory 1n3, issue a lock command to one of the MSCPs not in trouble on the basis of that information. Any one MSCP may be specified, as the MSCP to which this lock command is to be issued, by executing a hash function on an identifier, e.g. the identification number, of the inter-host shared resource.

Thus is completed the operation of the fourth preferred embodiment of the present invention.

In the fourth embodiment, unlike in the first and second embodiments, lock information held by normal MSCPs is not deleted but only the lock information held by the MSCP in trouble is recovered in other normal MSCPs instead of once deleting lock information held by all the MSCPs and recovering it in other normal MSCPs, resulting in the benefit that recovery processing can be performed more efficiently as much as the processing to delete lock information held by the MSCPs in the first or second embodiment is dispensed with.

To add, although any one MSCP may be specified, in the first through fourth embodiments, as the MSCP to which a lock command is to be reissued from a lock control means 1n1 by executing a hash function on an identifier, e.g. the identification number, of the inter-host shared resource for which the lock command is to be issued, the method to specify the MSCP is not limited to execution of a hash function, but the lock command may as well be issued to one of a plurality of MSCPs in rotation or preferentially to an MSCP the load on which is smaller (less frequent).

As hitherto described, the recovery system for system coupling apparatuses according to the invention provides the benefit that, even if an MSCP fails during the operation of the computer system, AP execution, i.e. the operation of the computer system can be continued without having to wait for the restoration of the MSCP in trouble because the lock information held by all the MSCPs including that in trouble is then held distributively among the remaining MSCPs.

Although the invention has been described in detail above with reference to various preferred embodiments thereof, it will be appreciated by those skilled in the art that these embodiments have been provided solely for the purpose of illustration, and are in no way to be regarded as limiting the scope of the invention. Instead, various modifications and substitutions of equivalent techniques will be apparent to those skilled in the art upon reading this specification, and such modifications and substitutions are to be regarded as falling within the true scope and spirit of the following claims.

What is claimed is:

1. A recovery system for system coupling apparatuses consisting of a plurality of hosts and a plurality of coupling apparatuses for holding lock information on inter-host shared resources for common use by the plurality of hosts, wherein:

each of said plurality of hosts requests one of the system coupling apparatuses to lock one of the inter-host shared resources, and stores lock information notified by the system coupling apparatus having locked the inter-host shared resource in compliance with the request;

each of said plurality of system coupling apparatuses locks an inter-host shared resource whose locking has been requested by one of the hosts, holds lock information indicating that the inter-host shared resource has been locked, and notifies the requesting host of the lock information;

one of said plurality of hosts, when one of said plurality of system coupling apparatuses fails, causes lock information held by other normal system coupling apparatuses to be deleted; and each of said plurality of hosts requests one of said other normal system coupling apparatuses to lock an inter-host shared resource on the basis of lock information stored in the requesting host.

2. A recovery system for system coupling apparatuses, as claimed in claim 1, further provided with a reserve system coupling apparatus, wherein:

each of said plurality of hosts requests one of a plurality of system coupling apparatuses consisting of said other normal system coupling apparatuses plus said reserve system coupling apparatus to lock an inter-host shared resource on the basis of lock information stored in the requesting host.

3. A recovery system for system coupling apparatuses, as claimed in claim 1, wherein:

one of said plurality of hosts, when it recognizes that another system coupling apparatus has been newly connected, causes lock information held by previously provided system coupling apparatuses to be deleted; and each of said plurality of hosts requests one of a plurality of system coupling apparatuses consisting of said previously provided system coupling apparatuses plus said newly connected system coupling apparatus to lock an inter-host shared resource on the basis of lock information stored in the requesting host.

4. A recovery system for system coupling apparatuses consisting of a plurality of hosts and a plurality of coupling apparatuses for holding lock information on inter-host shared resources for common use by the plurality of hosts, wherein:

each of said plurality of hosts requests one of the system coupling apparatuses to lock one of the inter-host shared resources, and stores lock information notified by the system coupling apparatus having locked the inter-host shared resource in compliance with the request;

each of said plurality of system coupling apparatuses locks an inter-host shared resource whose locking has been requested by one of the hosts, holds lock information indicating that the inter-host shared resource has been locked, and notifies the requesting host of the lock information and an identifier of its own;

one of said plurality of hosts, when it recognizes that one of said plurality of system coupling apparatuses has failed, notifies other hosts of the failure; and each of said plurality of hosts, if it is holding lock information including an identifier of the faulty system coupling apparatus, requests one of said other normal system coupling apparatuses to lock an inter-host shared resource solely on the basis of that lock information.

5. A recovery system for system coupling apparatuses, as claimed in claim 4 wherein:

each of said plurality of hosts, if it is holding lock information including an identifier of affaulty system coupling apparatus, requests one of a plurality of system coupling apparatuses consisting of said other normal system coupling apparatuses plus said reserve system coupling apparatus to lock an inter-host shared resource solely on the basis of the lock information.

6. A recovery system for system coupling apparatuses consisting of a plurality of hosts and a plurality of coupling apparatuses for holding lock information on a plurality of inter-host shared resources to be accessed from application programs executed on the plurality of hosts, wherein:

each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus;

each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the host having issued the lock command of the lock information;

one of said plurality of hosts, when one of said plurality of system coupling apparatuses fails, causes lock information held by other normal system coupling apparatuses to be deleted; and each of said plurality of hosts specifies, out of said other normal system coupling apparatuses, the system coupling apparatus to execute a hash function on an identifier of the inter-host shared resource contained in the lock information stored in itself to which a lock command is to be issued, and issues a lock command for the inter-host shared resource indicated by the lock information to the specified system coupling apparatus.

7. A recovery system for system coupling apparatuses, as claimed in claim 6, further provided with a reserve system coupling apparatus wherein:

each of said plurality of hosts specifies, out of a plurality of system coupling apparatuses consisting of said other normal system coupling apparatuses plus said reserve system coupling apparatus, the system coupling apparatus to execute a hash function on an identifier of the inter-host shared resource contained in the lock information stored in itself to which a lock command is to be issued, and issues a lock command for the inter-host shared resource indicated by the lock information to the specified system coupling apparatus.

8. A recovery system for system coupling apparatuses, as claimed in claim 6, wherein:

one of said plurality of hosts, when it recognizes that another system coupling apparatus has been newly connected, causes lock information held by previously provided normal system coupling apparatuses to be deleted; and each of said plurality of hosts specifies, out of a plurality of system coupling apparatuses consisting of said previously provided system coupling apparatuses plus said newly connected system coupling apparatus, the system coupling apparatus to execute a hash function on an identifier of the inter-host shared resource contained in the lock information stored in itself to which a lock command is to be issued, and issues a lock command for the inter-host shared resource indicated by the lock information to the specified system coupling apparatus.

9. A recovery system for system coupling apparatuses consisting of a plurality of hosts and a plurality of coupling apparatuses for holding lock information on inter-host shared resources to be accessed from application programs executed on the plurality of hosts, wherein:

each of said plurality of hosts receives from said application program executed on itself a lock request for one of the inter-host shared resources, specifies the system coupling apparatus to execute a hash function on an identifier of the inter-host shared resource to which a lock command corresponding to the lock request is to be issued, issues a lock command for the inter-host shared resource to the specified system coupling apparatus, and stores lock information notified from the specified system coupling apparatus;

each of said plurality of system coupling apparatuses receives a lock command from one of the hosts, executes lock processing if the inter-host shared resource on which the lock command is to be executed is not locked, holds lock information indicating that the inter-host shared resource has been locked, and notifies the host having issued the lock command of the lock information and an identifier of its own;

one of said plurality of hosts, when it recognizes that one of said plurality of system coupling apparatuses has failed, notifies other hosts of the failure; and each of said plurality of hosts, if it is holding lock information including an identifier of the faulty system coupling apparatus, specifies, out of said other normal system coupling apparatuses, the one to become the destination of a lock command by executing a hash function on the identifier of the inter-host shared resource contained in that lock information stored in itself, and issues the lock command for the inter-host shared resource indicated by the lock information to the specified system coupling apparatus.

10. A recovery system for system coupling apparatuses, as claimed in claim 9, further provided with a reserve system coupling apparatus wherein:

each of said plurality of hosts, if it is holding lock information including an identifier of the faulty system coupling apparatus, specifies, out of a plurality of system coupling apparatuses consisting of said other normal system coupling apparatuses plus said reserve system coupling apparatus, the system coupling apparatus to become the destination of a lock command by executing a hash function on the identifier of the inter-host shared resource contained in that lock information stored in itself, and issues a lock command for the inter-host shared resource indicated by the lock information to the specified system coupling apparatus.

11. One or more recording media recording thereon a program making it possible to cause:
   each of a plurality of hosts to perform processing to request one of a plurality of coupling apparatuses to lock one of inter-host shared resources for common use by said plurality of hosts;
   each of said plurality coupling apparatuses to lock an inter-host shared resource as requested by one of the hosts, to hold lock information indicating that the inter-host shared resource has been locked; and to perform processing to notify the requesting host of the lock information;
   each of said plurality of hosts to perform processing to store the lock information notified by the system coupling apparatus;
   one of said plurality of hosts, when one of said plurality of system coupling apparatuses fails, to delete lock information held by other normal system coupling apparatuses; and
   each of said plurality of hosts to perform processing to request one of said plurality of other normal system coupling apparatuses to lock an inter-host shared resource on the basis of lock information stored in the requesting host.

12. Storage media, as claimed in claim 11, recording thereon a program making it possible to cause:
   each of said plurality of hosts to perform processing to request one of a plurality of system coupling apparatuses consisting of said other normal system coupling apparatuses plus a reserve system coupling apparatus to lock an inter-host shared resource on the basis of lock information stored in the requesting host.

13. Storage media, as claimed in claim 11, recording thereon a program making it possible to cause:
   one of said plurality of hosts, when it recognizes that another system coupling apparatus has been newly connected, to delete lock information held by previously provided normal system coupling apparatuses; and
   each of said plurality of hosts to perform processing to request one of a plurality of system coupling apparatuses consisting of said previously provided system coupling apparatuses plus said newly connected system coupling apparatus to lock an inter-host shared resource on the basis of lock information stored in the requesting host.

14. One or more recording media recording thereon a program making it possible to cause:
   each of a plurality of hosts to perform processing to request one of a plurality of coupling apparatuses to lock one of inter-host shared resources for common use by said plurality of hosts;
   each of said plurality of said system coupling apparatuses to lock an inter-host shared resource as requested by one of the hosts, to hold lock information indicating that the inter-host shared resource has been locked; and to perform processing to notify the requesting host of the lock information and an identifier of its own;
   each of said plurality of hosts to perform processing to store the lock information notified by the system coupling apparatus;
   one of said plurality of hosts, when it recognizes that one of said plurality of system coupling apparatuses has failed, to notify other hosts of the failure; and
   each of said plurality of hosts, if it is holding lock information including an identifier of the faulty system coupling apparatus, to perform processing to request one of said plurality of other normal system coupling apparatuses to lock an inter-host shared resource solely on the basis of that lock information.

15. Storage media, as claimed in claim 11, recording thereon a program making it possible to cause:
   each of said plurality of host, if it is holding lock information including an identifier of the faulty system coupling apparatus, to perform processing to request one of a plurality of system coupling apparatuses consisting of said other normal system coupling apparatuses plus a reserve system coupling apparatus to lock an inter-host shared resource solely on the basis of that lock information.

16. A group of recording media, wherein said program in claim 11 is divided into a plurality of parts, and each of said parts is recorded on one or another of said media.

17. A program embodied in electric signals, making it possible to cause:
   each of a plurality of hosts to perform processing to request one of a plurality of coupling apparatuses to lock one of inter-host shared resources for common use by said plurality of hosts;
   each of said plurality coupling apparatuses to lock an inter-host shared resource as requested by one of the hosts, to hold lock information indicating that the inter-host shared resource has been locked; and to perform processing to notify the requesting host of the lock information;
   each of said plurality of hosts to perform processing to store the lock information notified by the system coupling apparatus;
   one of said plurality of hosts, when one of said plurality of system coupling apparatuses fails, to delete lock information held by other normal system coupling apparatuses; and
   each of said plurality of hosts to perform processing to request one of said plurality of other normal system coupling apparatuses to lock an inter-host shared resource on the basis of lock information stored in the requesting host.

18. A program embodied in electric signals, making it possible to cause:
   each of a plurality of hosts to perform processing to request one of a plurality of coupling apparatuses to lock one of inter-host shared resources for common use by said plurality of hosts;
   each of said plurality of said system coupling apparatuses to lock an inter-host shared resource as requested by one of the hosts, to hold lock information indicating that the inter-host shared resource has been locked; and to perform processing to notify the requesting host of the lock information and an identifier of its own;
   each of said plurality of hosts to perform processing to store the lock information notified by the system coupling apparatus;
   one of said plurality of hosts, when it recognizes that one of said plurality of system coupling apparatuses has failed, to notify other hosts of the failure; and
   each of said plurality of hosts, if it is holding lock information including an identifier of the faulty system coupling apparatus, to perform processing to request one of said plurality of other normal system coupling apparatuses to lock an inter-host shared resource solely on the basis of that lock information.

* * * * *